United States Patent [19]
Katcherian et al.

[11] Patent Number: 5,112,101
[45] Date of Patent: May 12, 1992

[54] WINDOW REVEAL MOLDING

[75] Inventors: Ricky V. Katcherian, Northville; Stephen R. Roddy, Grosse Pointe Park, both of Mich.

[73] Assignee: General Motors Corporation, Detroit, Mich.

[21] Appl. No.: 716,468

[22] Filed: Jun. 17, 1991

[51] Int. Cl.⁵ .............................................. B60J 1/00
[52] U.S. Cl. ...................................... 296/201; 52/208
[58] Field of Search .................. 296/201, 195; 52/208, 52/400

[56]     References Cited
U.S. PATENT DOCUMENTS

| | | | |
|---|---|---|---|
| 4,351,559 | 9/1982 | Sugisawa | 296/195 |
| 4,765,673 | 8/1988 | Frabotta et al. | 296/93 |
| 5,001,876 | 3/1991 | Harper et al. | 296/201 |
| 5,009,462 | 4/1991 | Katcherian | 296/201 |

FOREIGN PATENT DOCUMENTS

| | | |
|---|---|---|
| 76924 | 4/1983 | European Pat. Off. |
| 2564691 | 11/1985 | France |

*Primary Examiner*—Robert R. Song
*Attorney, Agent, or Firm*—Raymond I. Bruttomesso, Jr.

[57]     ABSTRACT

A molding installation has a molding concealing a space between an edge of a window panel and a compartment lid. The molding is mounted on a body panel of the motor vehicle by a curable adhesive. The molding has a C-shaped channel member of plastic material fitted on the edge of the window panel and having spaced apart outer and inner legs which forcibly grip the opposed outer and inner faces of the window panel. A means of spacing the channel is coextruded with the channel member and adapted for engaging the body panel of the motor vehicle to space the window panel from the motor vehicle. A locking nub is coextruded with the channel member and has a head spaced from the channel member by a neck. The head is adapted to seat within the curable adhesive to mechanically retain the molding onto the body panel. A decorative portion is extruded integral with the means of spacing and has a brim projects towards the compartment lid for overlying the space between window panel and the compartment lid. A close out lip is extruded integral with the means of spacing and underlies the brim and depends into engagement with the body panel underlying the compartment lid and adapted for covering the underlying body panel.

4 Claims, 2 Drawing Sheets

WINDOW REVEAL MOLDING

This invention relates to a fixed glass molding and more particularly to a molding assembly for lower edge of a back window which is adjacent to a deck lid.

BACKGROUND OF THE INVENTION

It is known to have a vehicle with a rear window which covers a rear window opening. The window is mounted to the body panel by an adhesive and is sapced away from the panel by a set of sapcers. A lower edge of the window is located in proximity to a rear compartment lid where the lid covers a rear compartment opening.

A plurality of retainers are attached to a series of studs welded on the body near the lower edge of the window. A lower molding, which covers the body panel and the retainer between a reveal molding and the rear compartment lid, is held to the retainers by a plurality of screws. The reveal molding, which is engaged by the lower molding, has a C-shaped channel to capture the lower edge o the window.

It would be disirable to have a one piece molding assembly having an integral spacing feature, capable of mechanically bonding to the adhesive and which allows the molding to flex pass the rear compartment lid during mounting to the body panel.

SUMMARY OF THE INVENTION

This invention provides a molding installation having a molding concealing a sapce between an edge of a window panel and a compartment lid. The molding is mounted on a body panel of the motor vehicle by a curable adhesive. The molding has a C-shaped channel member of plastic material fitted on the edge of the window panel and having space apart outer and inner legs which forcibly grip the opposed outer and inner faces of the window panel. A means of spacing the channel is extruded integral with the channel member and adapted for engaging the body panel of the motor vehicle to space the window panel from the motor vehicle. A locking nub is coextruded with the channel member and has a head spaced from the channel member by a neck. The head is adapted to seat within the curable adhesive mechanically retaining the molding onto the body panel. A decorative portion is coextruded with the channel member and has a brim projects towards the compartment lid overlying the space between window panel and the compartment lid. A close out lip is coextruded with the channel means of spacing and underlies the brim and depends into engagement with the body panel underlying the compartment lid and adapted for covering the underlying body panel.

One object, feature and advantage resides in the provision of a dual durometer molding having a pliable portion having a pair of underpinnings extruded integral with a rigid channel member and adapted for engaging the body panel of the motor vehicle to space the window panel from the motor vehicle and a locking nub coextruded with the channel member having a head spaced from the channel member and the underpinnings by a neck and the head adapted to seat within the curable adhesive to mechanically retaining the molding onto the body panel and a decorative portion coextruded with the pair of underpinnings and having a brim projecting towards the compartment lid for overlying the space between window panel and the compartment lid, and a close out lip coextruded with the pair of underpinnings underlying the brim and depending into engagement with the body panel underlying the compartment lid and adapted for covering the underlying body panel.

Another object, feature and advantage resides in the provision of a close out lip of the molding coextruded with a pair of underpinnings underlies a brim and depends into engagement with the body panel underlying the compartment lid and adapted for covering the underlying body panel.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
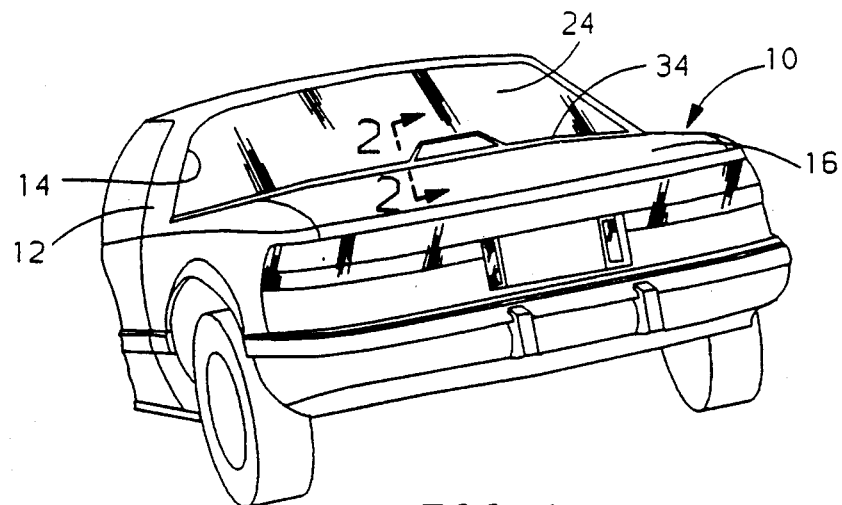
FIG. 1 is a perspective view of a vehicle having a window molding according to the invention.
Figure 2:
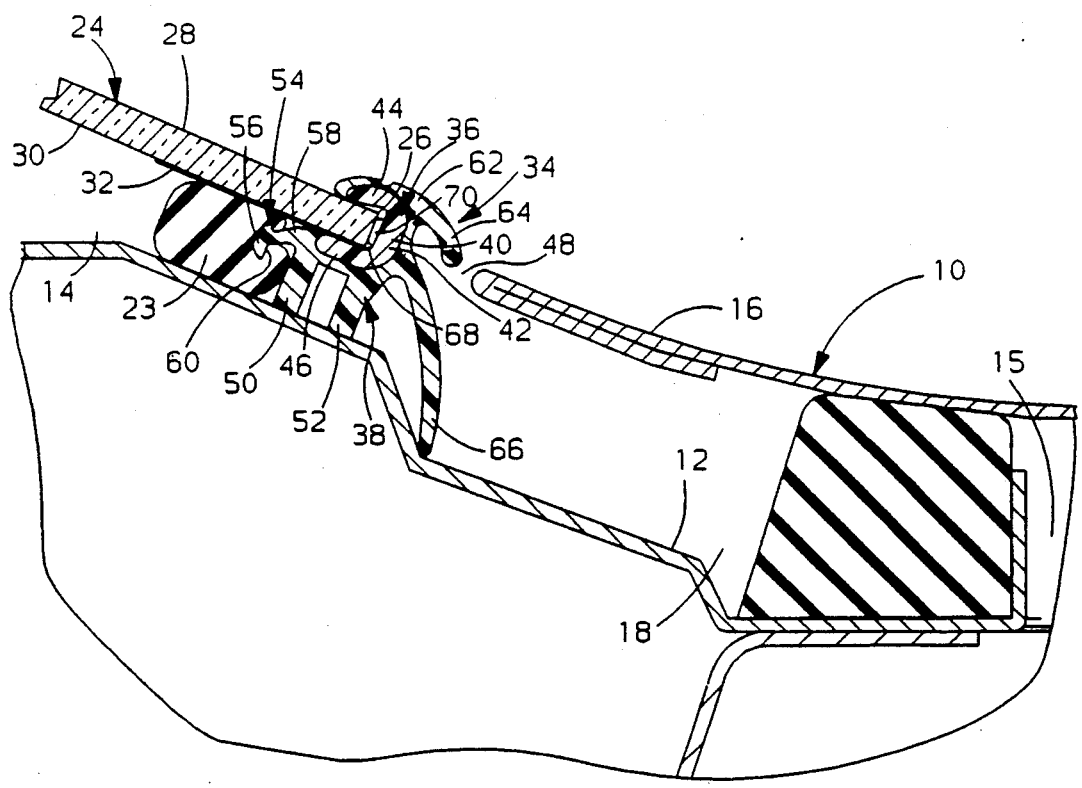
FIG. 2 is a cross sectional view taken in the direction of arrows 2—2 of FIG. 1.

Referring to FIGS. 1 and 2, it is seen that a vehicle body 10 has a rear window panel 24 for covering a rear window opening 14 in a sheet metal body panel 12. In close proximity to a lower edge 26 of the window panel 24, a rear compartment lid 16 covers a rear compartment opening 15 in the body panel 12. The compartment lid 16 is hingely connected to the vehicle body by a pair of hinges, not shown. The sheet metal body panel 12 has a portion defining a drainage trough 18 that underlies the rear compartment lid 16 for draining water that enters the rear compartment opening 15.

Referring to FIG. 2, the window panel 24 is installed in the window opening 14 of the vehicle body 10 by a bead of curable urethane adhesive 23. A black coating 32 is located on an inner face 30 of the window panel 24 near the lower edge 26. The black coating 32 prevents the body panel 12 and the adhesive 23 from being seen when looking from the exterior of the vehicle through an outer face 28 of the window panel 24.

A window reveal molding, generally indicated at 34, is provided to seal the window panel 24 to the body panel 12 and conceal a space 48 between the rear window panel 24 and the rear compartment lid 16. The reveal molding 34 is coextruded polyvinyl chloride, or other suitable plastic, and includes a rigid portion 36 and a pliable portion 38. The rigid portion 36 has a C-shaped pair of underpinnings 40 having a base wall 42, an outer leg 44 and an inner leg 46. The spacing between the legs 44 and 46 is somewhat less than the thickness of the rear window panel 24 so that the outer leg 44 will engage with the outer face 28 of the window panel 24 and the inner leg 46 will engage the inner face 30 of the rear window panel 24.

The pliable portion 38 encases the rigid portion 36 and has a pair of stanchions 50 and 52 which depends towards and engages the body panel 12. The stanchions 50 and 52 space the rear window panel 24 from the body panel 12. The first stanchion 50 directly underlies the window panel 24 and the inner leg 46. The second stanchion 52 underlies the base wall 42 of the rigid portion 36. A locking nub 54 of the pliable portion 38 protrudes towards the window opening 14 of the vehicle body 10. A head 56 of the locking nub 54 is spaced from the first stanchion 50 by a neck 58 thereby defining an edge 60. The urethane adhesive 23 surrounds the head 56 and fills the edge 60 to mechanically retain the molding 34 to assist in retaining the window panel 24. Although the adhesive 23 may not have a tenacious bond with the molding 34, the locking nub 54 becomes mechanically embedded in the adhesive 23 so that the locking nub 54 is anchored and the molding 34 is substantially anchored against being rotated out of the installed position shown in FIG 2.

A decorative portion 62 of the pliable portion 38 covers the outer leg 44 of the rigid portion 36 and has a brim 64 which projects towards the rear compartment lid 16. The decorative portion 62 overlies the space 48 between the rear window panel 24 and the rear compartment lid 16 with the brim 64 terminating prior to the rear compartment lid 16. Thereby the decorative portion 62 presents a finished look.

A close out lip 66, a pliable portion 38 of the molding 34, projects generally downward and outward from the portion which encases the base wall 42. The close out lip 66 projects into engagement with the body panel 12 underlying the brim 64 and extending to underlie a portion of the rear compartment lid 16. The close out lip 66 hides from view the underlying body panel 12 including any surface primer or adhesive.

The window reveal molding 34 is applied to the window panel 24 prior to the window panel 24 being installed in the window opening. The molding 34 is installed on the lower edge 26 of the window panel 24 by spreading the legs 44 and 46 and pushing the molding 34 on to the lower edge 26 of the window panel 24. In addition, as seen in FIG. 2, a cavity 68 defined between the edge 26 of the window panel 24 and the base wall 42 of the molding 34 preferably contains a suitable bonding and sealing material such as a butyl adhesive 70. Accordingly, it will be understood that the molding 34 effectively attaches to the window panel 24 by an interference fit of the legs 44 and 46 against the inner and outer faces 26 and 28 of the window panel 24. Furthermore, the presence of the bonding and sealing butyl adhesive 70 in the cavity 68 further attaches the molding 34 to the window panel 24.

The window panel 24 and molding 34 assembly is placed in an assembly carousel where the bead of urethane adhesive 23 is applied to the window panel 24 and surrounds the head 56 of the locking nub 54. At the same time as the molding 34 and urethane adhesive 23 is being added to the window panel 24, the vehicle body 10 moves down the assembly line.

A robotic loading system, not shown, picks up the window assembly by suction cups or other suitable means and aligns the window assembly with the window opening 14. The window assembly is pressed against panel 12 so that the urethane 23 adheres the window assembly to the vehicle 10 and the stanchions 50 and 52 properly spacing the window panel 24 from the body panel 12. As the robotic loading system moves the window assembly into position, the close out lip 66 flexes in order to move pass the rear compartment lid 16 and then flexes into position engaging the body panel 12 hiding from view the primer and the urethane adhesive 23 giving the window assembly a finished look. The robotic loading system then releases the window assembly.

Figure 3:
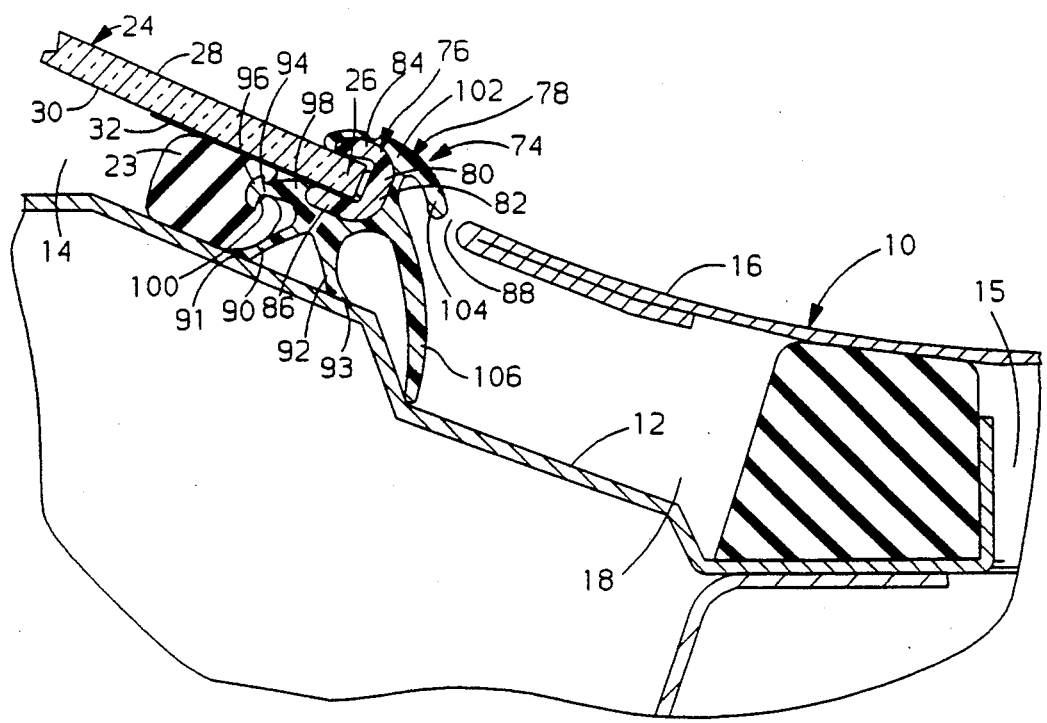
FIG. 3 is a cross sectional view of the second embodiment of the window molding.

Referring to FIG. 3, a second embodiment of a window reveal molding, generally indicated at 74, is provided to seal the window panel 24 to the body panel 12 and conceal a space 88 between the rear window panel 24 and the rear compartment lid 16. The reveal molding 74 is coextruded polyvinyl chloride, or other suitable plastic, and includes a rigid portion 76 and a pliable portion 78. The rigid portion 76 has a C-shaped pair of underpinnings 80 identical to the first embodiment with a base wall 82, an outer leg 84 and an inner leg 86. The spacing between the legs 84 and 86 is somewhat less than the thickness of the rear window panel 24 so that the outer leg 88 will engage with the outer face 28 of the window panel 24 and the inner leg 86 will engage the inner face 30 of the rear window panel 24.

The pliable portion 78 encases the rigid portion 76 and has a pair of underpinnings 90 and 92 which depends towards and engages with the body panel 12. The underpinnings 90 and 92 are splayed outwardly in a wide apart stance to space the rear window panel 24 from the body panel 12 to prevent the reveal molding 74 from rotating. A pair of ends 91 and 93 of the underpinnings 90 and 92 move farther apart the closer the window panel 24 is to the body panel 12. The size and material characteristics of the underpinnings 90 and 92 along with the amount and material characteristics of the urethane adhesive 23 determine how far the ends 91 and 93 of the underpinnings 90 and 92 are spaced apart.

A locking nub 94 of the pliable portion 78 protrudes towards the window opening 14 of the vehicle body 10. A head 96 of the locking nub 94 is spaced from the inner leg 86 and the underpinnings 90 and 92 by a neck 98 thereby defining an edge 100. The urethane adhesive 23 surrounds the head 96 and fills the edge 100 to mechanically retain the molding 74 to assist in retaining the window panel 24.

A decorative portion 102 of the pliable portion 78 covers the outer leg 84 of the rigid portion 76 and has a brim 104 which projects towards the rear compartment lid 16. The decorative portion 102 overlies the space 88 between the rear window panel 24 and the rear compartment lid 16 with the brim 104 terminating prior to the rear compartment lid 16.

A close out lip 106, a pliable portion 78 of the molding 74, projects generally downward and outward from the portion which encases the base wall 82. The close out lip 106 projects into engagement with the body panel 12 covering from view the underlying body panel 12 including any surface primer or adhesive.

The window panel 24 and the reveal molding 74 are mounted to the body panel 12 similar to the first embodiment. A difference from the first embodiment is that the underpinnings 90 and 92 flex relative to the weight of the rear window 24. The underpinnings 90 and 92 of the molding 74 must be therefore sized so that the flexure of the underpinnings 90 and 92 places the molding 74 in the desired position. The underpinnings 90 and 92 compensate for minor protrusion in the frame 12 due to items such as spot welds.

Figure 4:
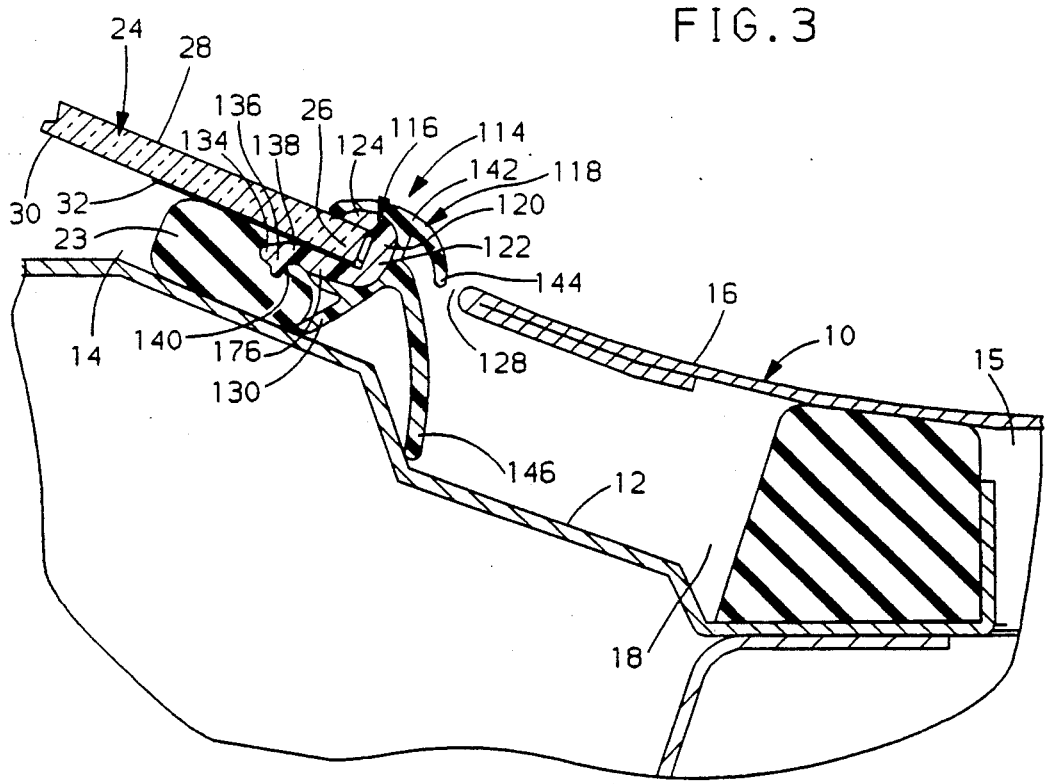
FIG. 4 is a cross sectional view of the third embodiment of the window molding.

Referring to FIG. 4, a third embodiment of a window reveal molding, generally indicated at 114, is provided to seal the window panel 24 to the body panel 12 and conceal a space 128 between the rear window panel 24 and the rear compartment lid 16. The reveal molding 114 is coextruded polyvinyl chloride, or other suitable plastic, and includes a rigid portion 116 and a pliable portion 118. The rigid portion 116 has a C-shaped pair of underpinnings 120 having a base wall 122, an outer leg 124 and an inner leg 126. The spacing between the legs 124 and 126 is somewhat less than the thickness of the rear window panel 24 so that the outer leg 124 will engage with the outer face 28 of the window panel 24 and the inner leg 126 will engage the inner face 30 of the rear window panel 24.

A locking nub 134, of the rigid portion 116, protrudes towards the window opening 14 of the vehicle body 10. A head 136 of the locking nub 134 is spaced from the inner leg 126 by a neck 138 thereby defining an edge 140. The urethane adhesive 23 surrounds the head 136 and fills the edge 140 to mechanically retain the molding 114 to assist in retaining the window panel 24.

The pliable portion 118 encases the rigid portion 116 and has an underpinning 130 which depends towards and engages with the body panel 12. The underpinning 130 spaces the rear window panel 24 from the body panel 12.

A decorative portion 142 of the pliable portion 118 covers the outer leg 124 of the rigid portion 116 and has a brim 144 which projects towards the rear compartment lid 16. The decorative portion 142 overlies the space 128 between the rear window panel 24 and the rear compartment lid 16 with the brim 144 terminating prior to the rear compartment lid 16.

A close out lip 146, of the pliable portion 118, projects generally downward and outward from the portion which encases the base wall 122. The close out lip 146 projects into engagement with the body panel 12 covering from view the underlying body panel 12 including any surface primer or adhesive.

The underpinning 130 and close out lip 146 work together to prevent rotation of the molding 114. The window panel 24 and molding 114 are installed similarly to the first embodiment.

While several embodiments of the present invention have been explained, various modifications within the spirit and scope of the following claims will be readily apparent to those skilled in the art.

The embodiments of the invention in which an exclusive property or priviledge is claimed are defined as follows:

1. A motor vehicle window molding concealing a space between an edge of a window panel and a compartment lid and the molding mounted on a body panel of the motor vehicle by a curable adhesive, the molding comprising:
   a C-shaped channel ememeber of plastic material fitted on the edge of the window panel and having sapced apart outer and inner legs which forcibly grip the opposed outer and inner faces of the window panel;
   sapcing means coextruded with the channel member and adapted for engaging the body panel of the motor vehicle to sapce the window panel from the motor vehicle;
   a locking nub extruded with the channel member and having a head sapced from the channel member and the sapcing means by a neck and the head adapted to seat within the curable adhesive to mechnically retain the modling onto the body panel;
   a decorative portion extruded integral with the spacing means and having a brim projecting towards the compartment lid for overlying the sapce between window panel and the compartment lid; and
   a close out lip extruded integral with the spacing means and underlying the brim and depending into engagement with the body panel underlying the compartment lid and adapted for covering the underlying body panel.

2. A molding as in claim 1 wherein the sapcing means is a pair of stanchions depending towards and engaging the body panel where the first stanchion underlies the window panel and the inner leg.

3. A molding as in claim 1 wherein the channel member of the molding is adapated to receive a bead of adhesive by which the channel member is adhesively mounted onto the window panel.

4. A motor vehicle window molding installation having a dual durometer molding concealing a sapce between an edge of a window panel and a compartment lid and the molding mounted on a body panel of the motor vehicle by a curable adhesive, the molding comprising:
   a rigid portion having a C-shaped channel memember of plastic material fitted on the edge of the window pane and having sapced apart outer and inner legs which forcibly grip the opposed outer and inner faces of the window panel, the channel member being adapted to receive a bead of adhesive by which the channel member is adhesively mounted onto the window panel;
   a pliable portion having a pair of underpinnings coextruded with the channel member and adapted for engaging the body panel of the motor vehicle to sapce the window panel from the motor vehicle;
   a locking nub extruded integral with the channel member having a head spaced from the channel member and the underpinnings by a neck and the head adapted to seat within the curable adhesive to mechanically retain the molding onto the body panel;
   a decorative portion extruded integral with the pair of underpinnings and having a brim projecting towards the compartment lid for overlyng the sapce between window panel and the compartment lid with the brim terminating prior to compartment lid; and
   a close out lip extruded integral with the pair of underpinnings underlying the brim and depending into engagement with the body panel underlying the compartment lid and adapted for covering the underlying body panel.

* * * * *